(12) United States Patent
Hirata

(10) Patent No.: US 9,664,379 B2
(45) Date of Patent: May 30, 2017

(54) HEAT RECOVERY APPARATUS AND HEAT RECOVERY SYSTEM

(75) Inventor: Hiroaki Hirata, Toyonaka (JP)

(73) Assignee: Victor Tokuhan Co., Ltd., Osaka (JP)

( * ) Notice: Subject to any disclaimer, the term of this patent is extended or adjusted under 35 U.S.C. 154(b) by 448 days.

(21) Appl. No.: 14/238,627

(22) PCT Filed: Aug. 10, 2012

(86) PCT No.: PCT/JP2012/070546
§ 371 (c)(1),
(2), (4) Date: Feb. 12, 2014

(87) PCT Pub. No.: WO2013/024826
PCT Pub. Date: Feb. 21, 2013

(65) Prior Publication Data
US 2014/0150736 A1 Jun. 5, 2014

(30) Foreign Application Priority Data

Aug. 12, 2011 (JP) ................................ 2011-177096
Nov. 30, 2011 (JP) ................................ 2011-261849

(51) Int. Cl.
*F22D 1/32* (2006.01)
*F22D 11/06* (2006.01)
(Continued)

(52) U.S. Cl.
CPC ................ *F22D 1/32* (2013.01); *F22D 1/28* (2013.01); *F22D 11/06* (2013.01); *F28B 1/02* (2013.01)

(58) Field of Classification Search
CPC ..... F22D 1/28; F22D 1/32; F22D 1/42; F22D 11/06
(Continued)

(56) References Cited

U.S. PATENT DOCUMENTS 4,870,986 A * 10/1989 Barrett ............... G05D 23/1393
122/13.3
5,081,848 A * 1/1992 Rawlings ................ E01C 11/26
165/45

(Continued)

FOREIGN PATENT DOCUMENTS

JP          1-260204      10/1989
JP          4-13047        1/1992
(Continued)

*Primary Examiner* — Steven B McAllister
*Assistant Examiner* — Ko-Wei Lin
(74) *Attorney, Agent, or Firm* — Norris McLaughlin & Marcus, P.A.

(57) ABSTRACT

A heat recovery apparatus recovers steam drain including at least one of steam used in a different device and drain where the steam used in the different device is condensed so as to recover heat contained in the steam drain. The heat recovery apparatus includes a pump, which circulates water accumulated in a tank through circulation pipes, an ejector, which is interposed in the circulation pipes and suctions the steam drain and mixes the steam drain with the circulating water so as to recover the steam drain, and a ball tap and a temperature controller, which perform temperature control of the water in the tank by replenishing the tank with tap water after a part of the water in the tank is discharged in the case where the water in the tank has reached a preliminarily set first temperature.

19 Claims, 10 Drawing Sheets

(51) Int. Cl.
*F22D 1/28* (2006.01)
*F28B 1/02* (2006.01)

(58) Field of Classification Search
USPC .................. 122/1 R, 1 C, 441, 412, 19.1
See application file for complete search history.

(56) References Cited

U.S. PATENT DOCUMENTS

2006/0060542 A1* 3/2006 Sienel ................. F24D 19/0092
    210/774
2009/0071419 A1 3/2009 Franke et al.

FOREIGN PATENT DOCUMENTS

| JP | 7-55108 | 3/1995 |
| JP | 7-71817 | 3/1995 |
| JP | 8-170807 | 7/1996 |
| JP | 9-112808 | 5/1997 |
| JP | 2006-326447 | 12/2006 |
| JP | 2008-534909 | 8/2008 |
| JP | 2010-48450 | 3/2010 |
| JP | 2010048450 | * 3/2010 |

* cited by examiner

HEAT RECOVERY APPARATUS AND HEAT RECOVERY SYSTEM

BACKGROUND OF THE INVENTION

The present invention relates to a heat recovery apparatus and a heat recovery system that recover steam drain that includes at least one of steam used in a different device and drain where the steam used in the different device is condensed, so as to recover heat contained in the steam drain.

Conventionally, a known technique employs an ejector to recover steam drain that includes at least one of steam used in a different device and drain where the steam used in the different device is condensed. For example, a make-up water passage to a feed water tank of a boiler includes an ejector. In the ejector, water is injected to a diffuser from a nozzle and leaked steam from a shaft seal portion of a steam motor is suctioned to the make-up water passage through a leaked steam passage. This is disclosed as a leaked-steam-heat recovery structure (see Patent Literature 1).

This steam-heat recovery structure can mix leaked steam with makeup water to the feed water tank to preheat the feed-water to the boiler. In the following description, "steam drain" means at least one of the steam used in a different device (such as a pants presser and a steam iron in an industrial laundry) and drain where the steam used in the different device is condensed.

Related art is Japanese Unexamined Patent Application Publication No. 2010-48450

SUMMARY OF THE INVENTION

However, in the steam-heat recovery structure described in Patent Literature 1 above, it is difficult to control heat amount contained in leaked steam suctioned to the make-up water passage. Therefore, it has been difficult to control a temperature of water supplied to the boiler. Additionally, it has been difficult to generate water controlled at a different temperature (for example, 40° C.) to be supplied to a device (such as a washing machine) other than the boiler.

The present invention has been made in view of the above-described problems, and it is an object of the present invention to provide a heat recovery apparatus and a heat recovery system that efficiently heat water using heat of the steam drain so as to control a water temperature to be obtained. In the following description, the term "water" is used in the wide meaning including "warm water" and "hot water".

To solve the above-described problems, a heat recovery apparatus according to the present invention is constituted as follows.

That is, a heat recovery apparatus according to the present invention recovers steam drain that includes at least one of steam used in a different device and drain where the steam used in the different device is condensed so as to recover heat contained in the steam drain. The heat recovery apparatus includes a pump, an ejector, and a first temperature control unit. The pump is configured to circulate water accumulated in a tank through a circulation pipe. The ejector is interposed in the circulation pipe. The ejector is configured to suction the steam drain and mix the steam drain with the circulating water so as to recover the steam drain. The first temperature control unit is configured to perform a temperature control of the water in the tank by replenishing the tank with water from outside after a part of the water in the tank is discharged in a case where the water in the tank has reached a preliminarily set first temperature.

The heat recovery apparatus with this configuration allows the pump to circulate water accumulated in the tank through the circulation pipe. Subsequently, the ejector interposed in the circulation pipe suctions the steam drain so as to mix the steam drain with the circulating the water, thus recovering the steam drain. Thus, the steam drain can be efficiently recovered.

Mixing the steam drain recovered by the ejector with the circulating water gives the heat amount contained in the steam drain to the circulating water, thus heating the water in the tank. In the case where the water in the tank has reached the preliminarily set first temperature (for example, 80° C.), a part of the water in the tank is discharged and then the water is replenished into the tank from outside. This controls the temperature of the water in the tank so as to keep the temperature of the water discharged (supplied to, for example, a boiler) in a certain temperature range including the first temperature.

The heat recovery apparatus according to the present invention is preferred to further include a heat exchanging unit. The heat exchanging unit is arranged at a side surface of the tank. The heat exchanging unit is configured to perform heat exchange using a convective flow due to a temperature difference with respect to water accumulated in a different tank.

According to the heat recovery apparatus with this configuration, the heat exchanging unit is configured to use the temperature difference with the water accumulated in the different tank so as to allow heat exchange using the convective flow is arranged on the side surface of the tank. This allows efficiently heating the water accumulated in the different tank with the simple configuration.

In the heat recovery apparatus according to the present invention, the heat exchanging unit is preferred to include: at least one outlet through which the water accumulated in the tank flows out; and at least one inlet arranged at a lower side of the outlet. The water accumulated in the different tank flows into the tank through the inlet.

According to the heat recovery apparatus with this configuration, the water accumulated in the tank flows out from the outlet. The water accumulated in the different tank flows into the tank from the inlet arranged at the lower side of the outlet. This allows efficiently heating the water accumulated in the different tank by heat an exchange of convective flow with a simple configuration.

The heat recovery apparatus according to the present invention is preferred to further include a permanent magnet arranged in a water flow passage at a discharge side of the ejector to remove irons in water.

According to the heat recovery apparatus with this configuration, the permanent magnet used for iron removal of water is arranged in the water flow passage at the discharge side of the ejector. Accordingly, iron components contained in the circulating water and in the steam drain recovered by the ejector are attracted to the permanent magnet. This allows efficiently removing iron in the water in the tank and the steam drain recovered by the ejector.

The heat recovery apparatus according to the present invention is preferred to further include a separating unit configured to separate the steam drain into steam and drain. The ejector is configured to suction steam separated from the steam drain by the separating unit and mix the steam with circulating water so as to recover the steam.

According to the heat recovery apparatus with this configuration, the separating unit separates the steam drain into the steam and drain. Therefore, the iron component in the steam drain remains in the drain as a residue, but the iron component is not contained in the steam. This steam without the iron component is suctioned by the ejector so as to be mixed with the circulating water. Thus, the iron component contained in the steam drain is not mixed with water. Accordingly, it is not necessary to remove iron in the water within the tank and the steam recovered by the ejector.

In the heat recovery apparatus according to the present invention, the separating unit is preferred to include: a first pipe through which the steam drain is inserted; a second pipe through which the steam is inserted; and a third pipe through which the drain is inserted. The first pipe branches into the second pipe and the third pipe. The second pipe is coupled to an upper side of the first pipe.

According to the heat recovery apparatus with this configuration, the first pipe through which the steam drain is inserted branches into the second pipe through which the steam is inserted and the third pipe through which the drain is inserted. The second pipe is coupled to the upper side of the first pipe. This allows separating the steam drain into the steam and the drain with the simple configuration.

To solve the above-described problems, a heat recovery system according to the present invention is constituted as follows.

That is, a heat recovery system according to the present invention includes the heat recovery apparatus according to the present invention, a reserve tank in which water is accumulated, a first pipe, and a second pipe. The reserve tank includes: at least one outlet through which the water accumulated in the reserve tank flows out; and at least one inlet arranged at an upper side of the outlet. The water accumulated in the tank of the heat recovery apparatus flows into the reserve tank through the inlet. The first pipe couples the outlet of the heat recovery apparatus and the inlet of the reserve tank together so as to allow flow of water. The second pipe couples the outlet of the reserve tank and the inlet of the heat recovery apparatus together so as to allow flow of water.

According to the heat recovery system with this configuration, the water heated inside of the tank of the heat recovery apparatus flows into the reserve tank through the first pipe that couples the outlet of the heat recovery apparatus and the inlet of the reserve tank together so as to allow the flow of the water. The water accumulated in the reserve tank flows into the tank of the heat recovery apparatus through the second pipe that couples the outlet of the reserve tank and the inlet of the heat recovery apparatus so as to allow the flow of the water. This allows efficiently heating the water accumulated in the reserve tank by the heat exchange using the convective flows with the simple configuration.

The heat recovery system according to the present invention is preferred to further include a first valve, a second valve, and a second temperature control unit. The first valve is interposed in the first pipe. The first valve is configured to switch flow and shutoff of water in the first pipe. The second valve is interposed in the second pipe. The second valve is configured to switch flow and shutoff of water in the second pipe. The second temperature control unit is configured to shut off the first valve and the second valve in a case where a temperature of the water in the reserve tank has reached a preliminarily set second temperature.

The heat recovery system with this configuration shuts off the first valve, which is interposed in the first pipe and switches flow and shutoff of the water in the first pipe, and the second valve, which is interposed in the second pipe and switches flow and shutoff of the water in the second pipe, in the case where the temperature of the water in the reserve tank has reached the preliminarily set second temperature (for example, 40° C.). Thus, heating of the water accumulated in the reserve tank is stopped. This allows keeping the temperature of the water in the reserve tank in a certain temperature range including the second temperature (for example, 40° C.).

With the heat recovery apparatus and the heat recovery system according to the present invention, the water accumulated in the tank circulates through the circulation pipe by the pump. Subsequently, the ejector interposed in the circulation pipe suctions steam drain and mixes the steam drain with the circulating water so as to recover the steam drain, thus efficiently recovering the steam drain.

Mixing the steam drain recovered by the ejector with the circulating water gives the heat amount contained in the steam drain to the circulating water, thus heating the water in the tank. In the case where the water in the tank has reached the preliminarily set first temperature (for example, 30° C.), a part of the water in the tank is discharged and then the water is replenished into the tank. This controls the temperature of the water in the tank so as to control the temperature of the water discharged (supplied to, for example, a boiler) at the first temperature.

DETAILED DESCRIPTION OF THE INVENTION

Embodiments of the present invention will be described below by referring to the accompanying drawings.

—Structure of Pleat Recovery Apparatus 100—

Figure 1:
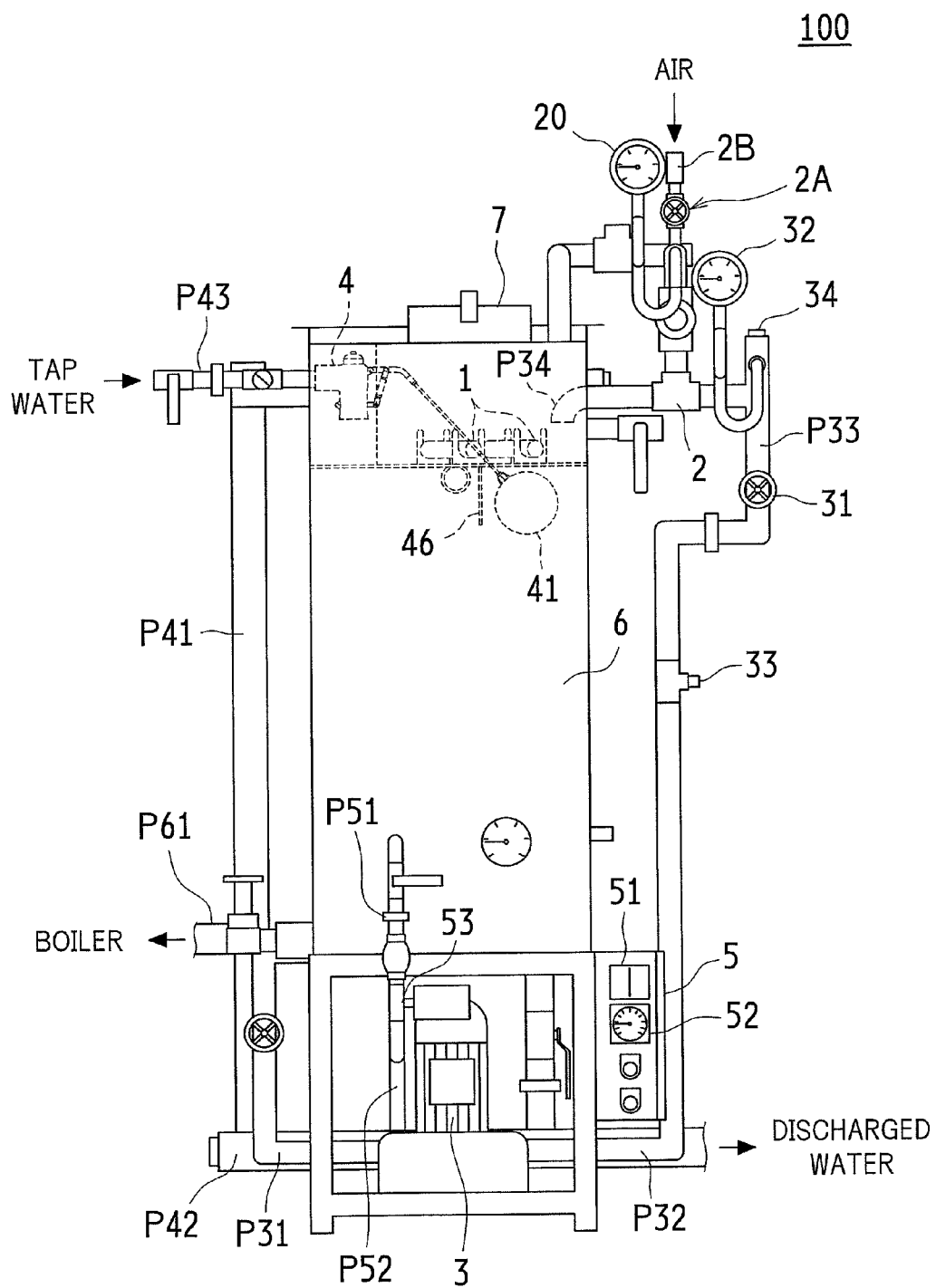
FIG. 1 is a front view illustrating one example of a heat recovery apparatus according to the present invention.
Figure 2:
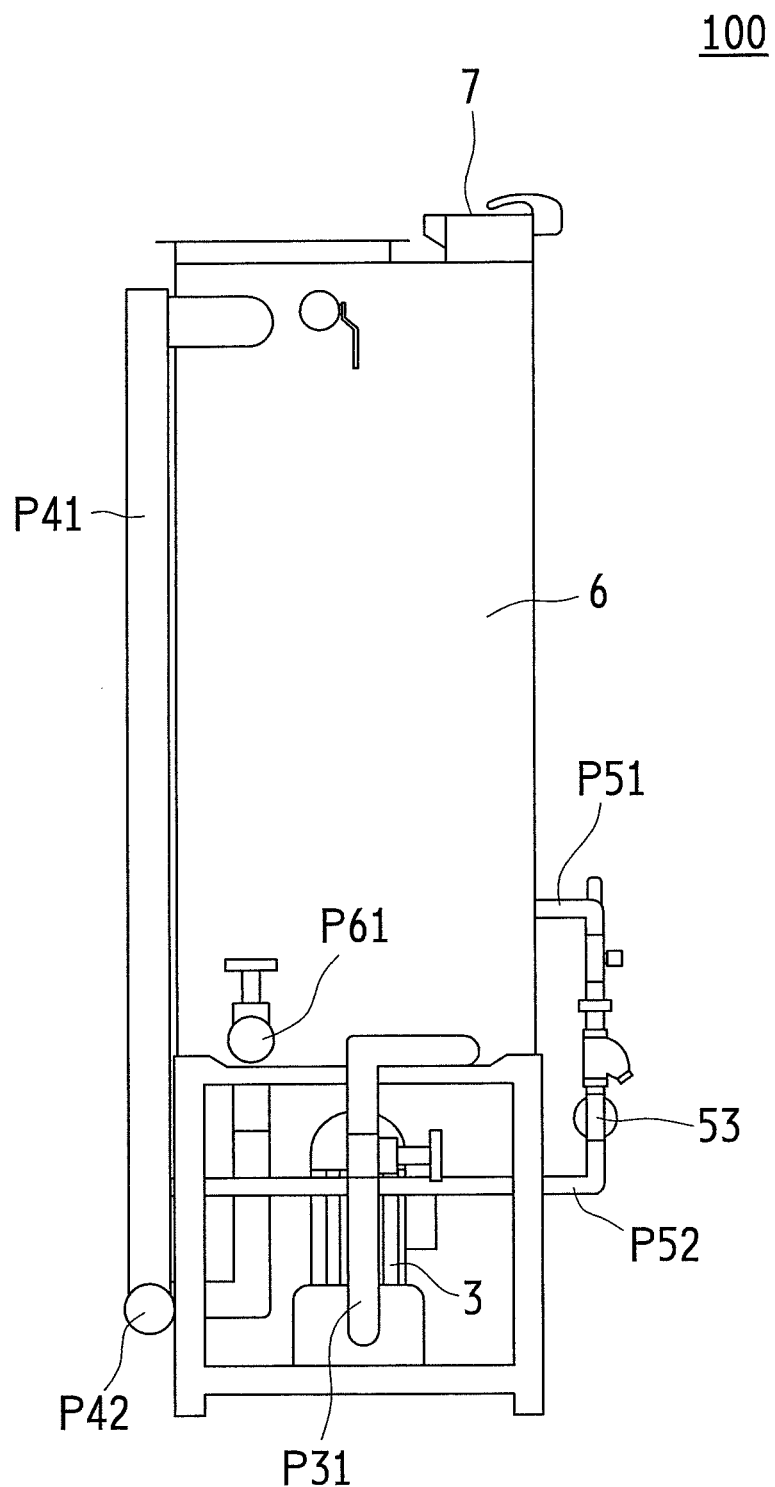
FIG. 2 is a left side view of the heat recovery apparatus in FIG. 1.
Figure 3:
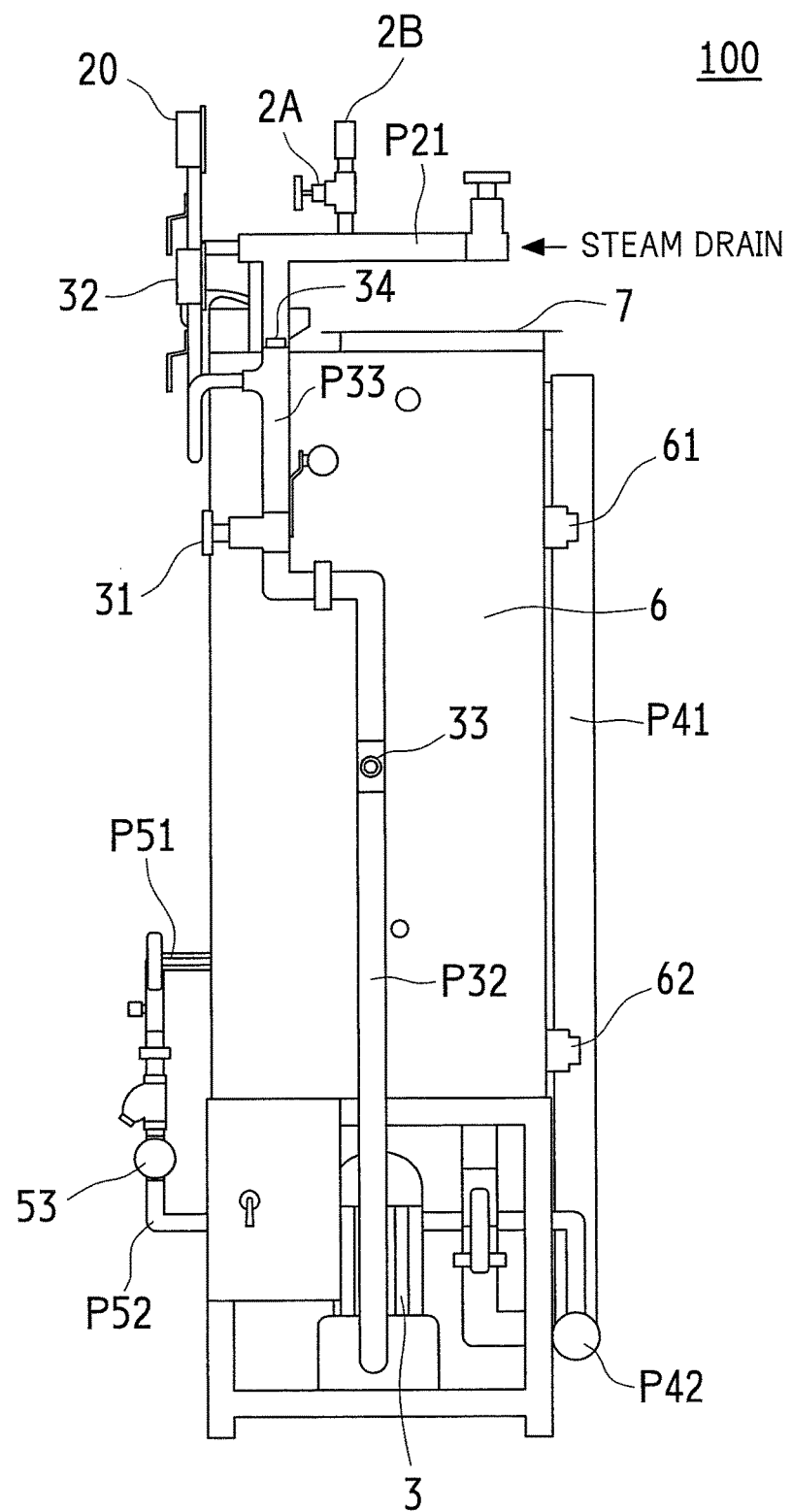
FIG. 3 is a right side view of the heat recovery apparatus in FIG. 1.
Figure 4:
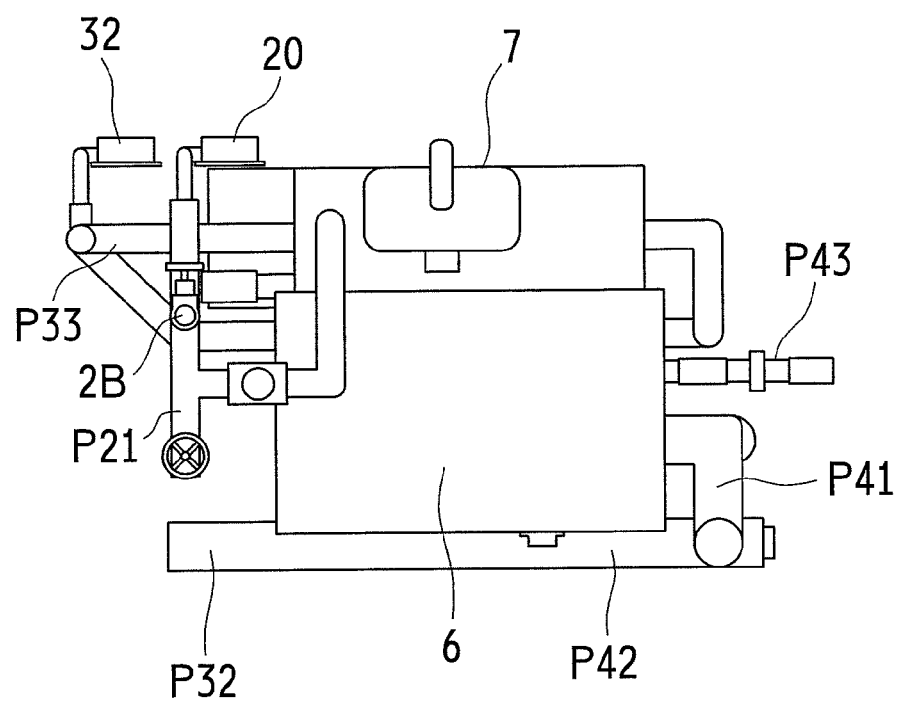
FIG. 4 is a top view of the heat recovery apparatus in FIG. 1.

FIG. 1 is a front view illustrating one example of a heat recovery apparatus 100 according to the present invention. FIG. 2 is a left side view of the heat recovery apparatus 100 in FIG. 1. FIG. 3 is a right side view of the heat recovery apparatus 100 in FIG. 1. FIG. 4 is a top view of the heat recovery apparatus 100 in FIG. 1. The heat recovery apparatus 100 according to this embodiment is arranged, for example, in various facilities such as an industrial laundry that uses steam.

In the industrial laundry, a boiler generates steam and the generated steam is supplied to a pants presser, a steam iron, and similar device. Here, the pants presser, the steam iron, and similar device correspond to a "different device"

described in the appended claims. Steam (used steam) used in the pants presser, the steam iron, and similar device and drain where the used steam is condensed are supplied to the heat recovery apparatus 100 through a recovery pipe P21. In the following description, "steam drain" includes at least one of steam used in a pants presser, a steam iron, and similar device and drain where the used steam is condensed.

Firstly, the structure of the heat recovery apparatus 100 will be described by referring to FIG. 1 to FIG. 4. The heat recovery apparatus 100 includes a permanent magnet 1, an ejector 2, a pump 3, a ball tap 4, a temperature controller 5, a tank 6, and an inspection lid 7.

The tank 6 accumulates water and is a quadrangular prism-shaped tank with a capacity of about 250 liters of water quantity here, in an upper portion of the tank 6, a ball tap 4 is arranged. The ball tap 4 supplies and stops tap water corresponding to moving up and down of the water level. The water level of water in the tank 6 is controlled by the ball tap 4. The structure of the ball tap 4 will be described later by referring to FIG. 5 to FIG. 7.

When the water level in the tank 6 decreases to a water level equal to or less than the lower limit water level, the ball tap 4 sets a valve in an "open" state so as to supply tap water. When the water level in the tank 6 has reached a reference water level, the ball tap 4 set the valve in a "closed" state so as to stop the supply of tap water. For example, in the case where the ejector 2 recovers a large amount of drain and the water level of the water in the tank 6 exceeds the upper limit water level, the water is discharged through pipes P41 and P42. Here, the ball tap 4 corresponds to a part of a "first temperature control unit" in the appended claims.

For example, the pump 3 is a centrifugal pump made of stainless steel (such as SUS304) and circulates the water accumulated in the tank 6 through circulation pipes P31, P32, P33, and P34. In a coupling portion between the circulation pipe P32 and the circulation pipe P33, a valve 31 is interposed. At the circulation pipe P33, a pressure gauge 32 is arranged. Further, in a coupling portion between the circulation pipe P33 and the circulation pipe P34, the ejector 2 is interposed. At the flow-out side of the circulation pipe P34, the permanent magnet 1 is arranged.

Opening and closing the valve 31 allows increasing and decreasing the flow rate of water to be supplied (circulated) to the ejector 2. That is, the larger the degree of opening of the valve 31 is, the more the flow rate of water to be supplied to the ejector 2 can be increased. As described later, in the ejector 2, the flow passage of the water is narrowed down. Accordingly, the larger the degree of opening of the valve 31 is, the more the hydraulic pressure measured by the pressure gauge 32 at a flow-in side of the ejector 2 increases.

The permanent magnet 1 is arranged at the flow-out side of the circulation pipe P34, and removes iron in water. The permanent magnet 1 is a column-shaped bar magnet where a plurality of (for example, five) magnetic domains are disposed in series. In this case, the boundary of the magnetic domains (the position where the S-pole and the N-pole are opposed and adjacent to each other) between the magnetic domains becomes significantly large. Therefore, iron components in water are attracted at the four boundaries between the magnetic domains for iron removal here. In this embodiment, two of the column-shaped permanent magnets 1 are arranged approximately parallel to each other (see FIG. 5).

The inspection lid 7 is openably/closably arranged on the top surface of the tank 6, and allows inspecting, removing, and mounting the permanent magnet 1. That is, opening the inspection lid 7 allows viewing the condition of attachment of iron powders and similar material to the permanent magnet 1 from outside. Additionally, opening the inspection lid 7 allows inserting a hand, a jig, or similar tool from the inspection lid 7 so as to remove the permanent magnet 1, remove the attached iron powders and similar material, and then mount the permanent magnet 1.

The ejector 2 is interposed between the circulation pipes P33 and P34, and suctions steam drain supplied from a pants presser, a steam iron, and similar device through the pipe P21 (see FIG. 3). The ejector 2 mixes the steam drain with water circulated by the pump 3 so as to recover the steam drain. At the pipe P21, a compound gauge 20 is arranged. The compound gauge 20 measures a negative pressure generated by the ejector 2. Here, the structure of the ejector 2 will be described later using FIG. 8.

Between the pipe P21 and the ejector 2, a vacuum break valve 2A and a check valve 2B are interposed, in the case where the negative pressure generated by the ejector 2 and detected by the compound gauge 20 becomes excessively large, the vacuum break valve 2A is set in an "open" state so as to reduce the negative pressure by suctioning the atmosphere (air) through a pipe (not illustrated). The check valve 2B is a valve interposed between the vacuum break valve 2A and a pipe (not illustrated) to prevent flowing out of water from the ejector 2 to a pipe.

—Temperature Control in Heat Recovery Apparatus 100—

In the case where water in the tank 6 has reached a preliminarily set first temperature T1 (for example, 80° C.), the temperature controller 5 discharges a part of the water in the tank 6 and then replenishes the tank 6 with tap water, so as to perform temperature control of the water in the tank 6. Here, the temperature controller 5 corresponds to a part of the "first temperature control unit" described in the appended claims. The temperature controller 5 includes a thermometer 51, a thermostat 52, an electrically-operated valve 53, and a controller 54 (not illustrated).

The electrically-operated valve 53 is an electrically operated type valve. When discharging the water in the tank 6, the electrically-operated valve 53 is set in an "open" state in accordance with an instruction from the controller 54. When stopping the discharge of the water in the tank 6, the electrically-operated valve 53 is set in a "closed" state in accordance with an instruction form the controller 54. In the case where the electrically-operated valve 53 is set in the "open" state, the water in the tank 6 flows out to the pipe P32 through pipes P51 and P52, thus being discharged.

The thermometer 51 detects a temperature of the water in the tank 6 and indicates the detection result in a viewable state from outside. Here, for convenience, a reference numeral is given to an arranging position of a meter that indicates a temperature of the water in the tank 6 as the thermometer 51.

The thermostat 52 determines whether or not the water in the tank 6 has reached the first temperature T1 (for example, 80° C.). When the thermostat 52 determines that the water has reached the first temperature T1, the controller 54 set the electrically-operated valve 53 in the "open" state. When the electrically-operated valve 53 is set in the "open" state, the water in the tank 6 flows out to the pipe P32 through the pipes P51 and P52. This decreases the water level in the tank 6. When the water level in the tank 6 decreases to equal to or less than the lower limit water level, the ball tap 4 sets a valve in an "open" state so as to supply tap water. When the supply of tap water is started, the temperature of the water in the tank 6 starts to decrease.

The thermostat 52 determines whether or not the water in the tank 6 has reached a third temperature T3 (for example, 70° C.). When the thermostat 52 determines that the water has reached the third temperature T3, the controller 54 sets the electrically-operated valve 53 in the "closed" state. That is, the electrically-operated valve 53 is set in the "open" state, and then the water in the tank 6 flows out to the pipe P32 through the pipes P51 and P52 and is discharged only in the case where the water in the tank 6 has a temperature in a range equal to or more than the third temperature T3 (for example, 70° C.) and equal to or less than the first temperature T1 (for example, 80° C.).

While in this embodiment the case where the water in the tank 6 is discharged when the electrically-operated valve 53 is set in the "open" state has been described, an embodiment where the water in the tank 6 is supplied to a different device (such as a boiler) when the electrically-operated valve 53 is set in the "open" state is possible.

As described above, in the tank 6, the water controlled at a temperature in the vicinity of the first temperature T1 (for example, 80° C.) is supplied to a boiler through a pipe P61. Between the pipe P61 and the boiler (not illustrated), a pump (not illustrated) is arranged. In the case where the water in the tank 6 is supplied to the boiler, the pump is driven.

Further, at the pipe P32, a pressure feeding port 33 is formed. At the pipe P33, a pressure feeding port 34 is formed. The pressure feeding port 33 and the pressure feeding port 34 are openings for pressure feeding of the water in the tank 6 to a different device (such as a boiler and a washing machine) using a pump pressure by the pump 3.

Accordingly, the pump 3 circulates the water accumulated in the tank 6 through the circulation pipes P31, P32, P33, and P34. Subsequently, the ejector 2 interposed with the circulation pipes P31, P32, P33, and P34 suctions steam drain and mixes the steam drain with the circulating water so as to recover the steam drain, thus efficiently recovering the steam drain.

Mixing the steam drain recovered by the ejector 2 with the circulating water gives the heat amount contained in the steam drain to the circulating water, thus heating the water in the tank 6. In the case where the water in the tank 6 has reached the preliminarily set first temperature T1 (for example, 80° C.), a part of the water in the tank 6 is discharged and then the water is replenished into the tank 6. This controls the temperature of the water in the tank 6 so as to control the temperature of the water discharged approximately at the first temperature T1.

While in this embodiment the case where the controller 54 sets the electrically-operated valve 53 in the "closed" state when the thermostat 52 determines that the water has reached the third temperature T3 has been described, an embodiment where the controller 54 sets the electrically-operated valve 53 in the "closed" state when the ball tap 4 sets the valve in the "open" state and then tap water is supplied is possible. In this case, the temperature of the water supplied to the boiler (not illustrated) becomes approximately the first temperature T1 (for example, 80° C.). This allows more strictly controlling the temperature of the water to be supplied to the boiler.

As illustrated in FIG. 3, an outlet 61 and an inlet 62 are formed on a side surface of the tank 6 of the heat recovery apparatus 100. The outlet 61 is an opening through which the water accumulated in the tank 6 flows out. The inlet 62 is an opening arranged at a lower side of the outlet 61, and the water accumulated in a different tank for example, a reserve tank 200 illustrated in FIG. 9) flows into the tank 6 through the inlet 62. Here, the outlet 61 and the inlet 62 correspond to a "heat exchanging unit" described in the appended claims.

Accordingly, the water accumulated in the tank 6 flows out from the outlet 61. The water accumulated in the different tank (for example, the reserve tank 200 illustrated in FIG. 9) flows into the tank 6 from the inlet 62 arranged at the lower side of the outlet 61. This allows efficiently heating the water accumulated in the different tank by heat exchange of a convective flow with a simple configuration. The heat exchange of the convective flow will be described in detail later using FIG. 9.

—Arrangement State of Permanent Magnets 1—

Figure 5:
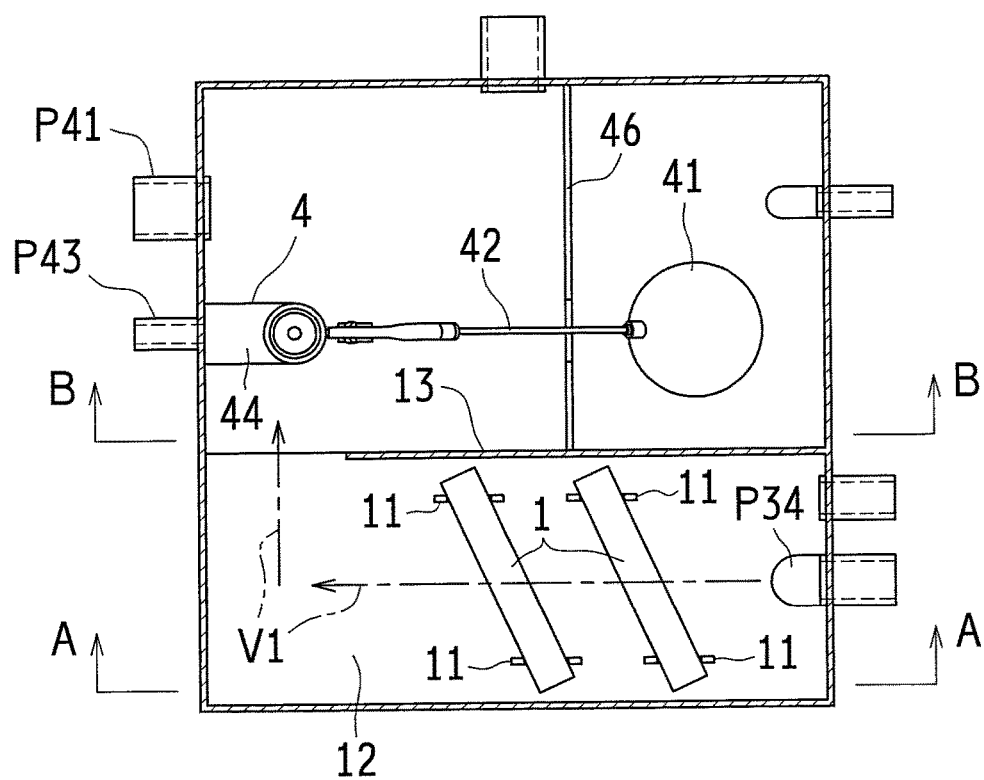
FIG. 5 is a transparent plan view illustrating one example of a permanent magnet, a ball tap, and similar member to be arranged in the heat recovery apparatus of FIG. 1.
Figure 6:
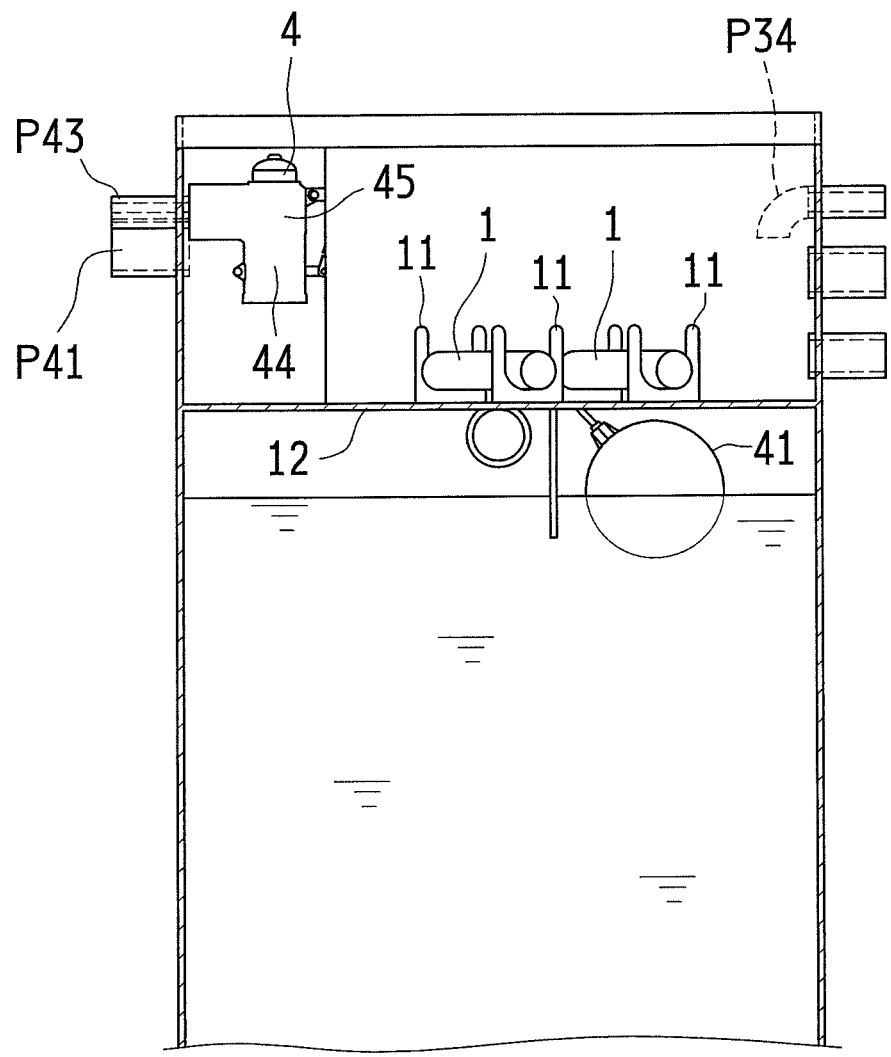
FIG. 6 is a cross-sectional view taken along the A-A cross section of FIG. 5.
Figure 7:
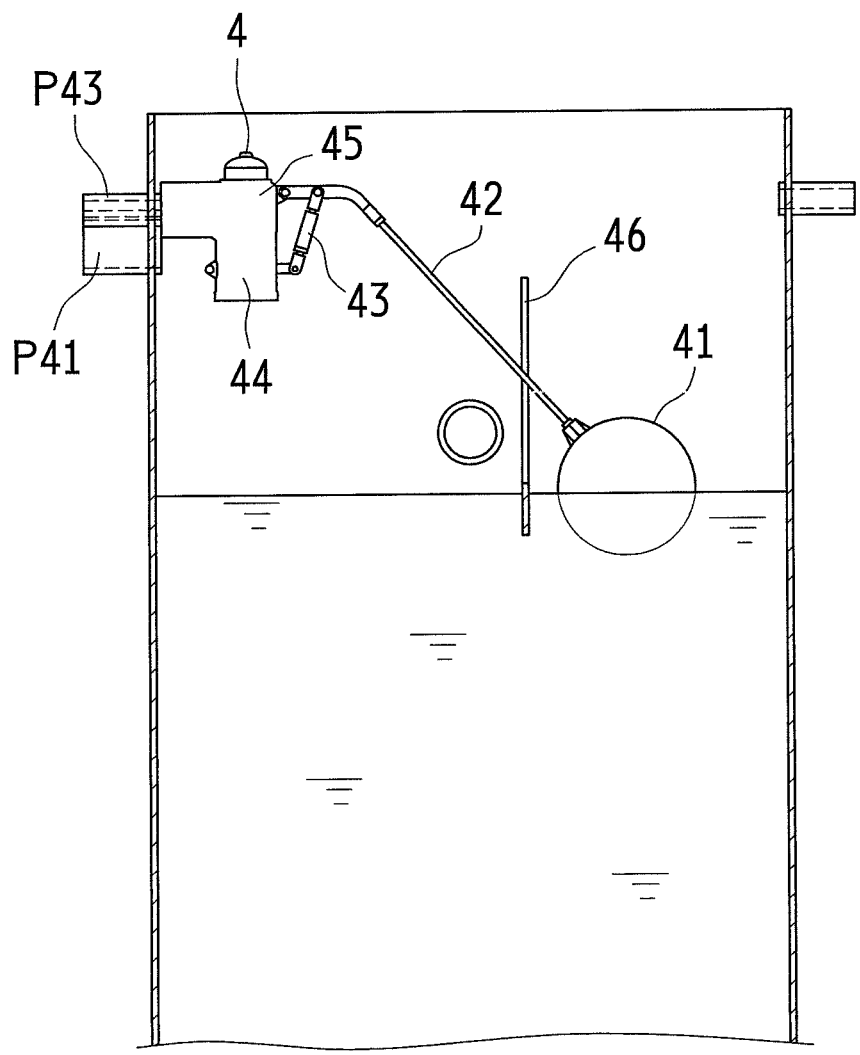
FIG. 7 is a cross-sectional view taken along the B-B cross section of FIG. 5.

Next, a description will be given of the arrangement state of the permanent magnets 1 and the structure of the ball tap 4 by referring to FIG. 5 to FIG. 7. FIG. 5 is a transparent plan view illustrating one example of the permanent magnets 1, the ball tap 4, and similar member arranged in the heat recovery apparatus 100 of FIG. 1. FIG. 6 is a cross-sectional view taken along the A-A cross section of FIG. 5. FIG. 7 is a cross-sectional view taken along the B-B cross section of FIG. 5. Firstly, the arrangement state of the permanent magnets 1 will be described by referring to FIG. 5 to FIG. 7.

As illustrated in FIG. 1, the permanent magnets 1 are arranged in the water flow passage at the discharge side of the circulation pipe P34 coupled to the discharge side of the ejector 2, so as to remove irons in water. The permanent magnet 1 is supported at near its both ends by the supporting members 11 formed approximately in a U shape, thus being secured. As illustrated in FIG. 6, a supporting member 11 is disposed upright on the top surface of a support plate 12 by welding or similar method, thus being secured. The support plate 12 is approximately horizontally formed above the water surface of the water in the tank 6.

As illustrated in FIG. 1 and similar figure, the inspection lid 7 is disposed above the permanent magnet 1. Accordingly, opening the inspection lid 7 allows viewing the condition of attachment of iron powders and similar material to the permanent magnet 1 from outside. Additionally, the permanent magnet 1 is supported at near its both ends by the supporting member 11 formed approximately in a U shape, thus being secured. This facilitates detaching the permanent magnet 1 from the supporting member 11 by opening the inspection lid 7, inserting a hand, a jig, or similar tool from the inspection lid 7, and lifting the permanent magnet 1. Further, this facilitates mounting the permanent magnet 1 on the supporting member 11 after iron powders or similar material attached to the permanent magnet 1 are removed.

The support plate 12 and a partition plate 13 are formed so as to form a flow passage of water flowing out from the circulation pipe P34. That is, the water flowing out from the circulation pipe P34 flows to the left side in FIG. 5 on the support plate 12 as indicated by an arrow V1 in FIG. 5, flows out to the upper side in FIG. 5 from the gap between the partition plate 13 and the tank 6, and flows down to the liquid surface of the water accumulated in the tank 6. Accordingly, the support plate 12 and the partition plate 13 form the flow passage of the water flowing out from the circulation pipe 134. The permanent magnet 1 is secured onto this water passage. This allows efficiently removing irons in water.

—Structure and Operation of Ball Tap 4—

Next, a description will be given of the structure and the operation of the ball tap 4 by referring to FIG. 5 to FIG. 7. As illustrated in FIG. 7, the ball tap 4 includes a floating ball 41, a support rod 42, a valve shaft 43, an open/close valve 44, and a housing 45. The floating ball 41 is secured to a distal end of the support rod 42, and floats on the liquid surface in the tank 6 to detect moving up and down of the liquid surface. The support rod 42 includes a one-side end portion (a left upper side end portion in FIG. 7) turnably joined to the housing 45 and the other-side end portion (a right lower end portion in FIG. 7) secured to the floating ball 41. In FIG. 5 to FIG. 7, for convenience, the open/close valve 44 is not illustrated.

The valve shaft 43 opens and closes the open/close valve 44, and includes a one-side end portion (a right upper end portion in FIG. 7) turnably joined adjacent to the supporting point of the support rod 42 and the other-side end portion (a left lower side end portion in FIG. 7) turnably joined to the open/close valve 44 arranged inside of the housing 45. The open/close valve 44 is a valve element that opens and closes for tap water supplied through a pipe P43. The open/close valve 44 is set in an "open" state when the open/close valve 44 is pressed down by the valve shaft 43, and is set in a "closed" state when the pressing down by the valve shaft 43 is released.

The ball tap 4 is thus constituted. Therefore, when the liquid surface of the tank 6 moves down and has reached a preliminarily set first position (for example, a position of 170 mm from the upper end of the tank 6), the valve shaft 43 presses down the open/close valve 44 and the open/close valve 44 is set in the "open" state. This supplies tap water to the inside of the tank 6 through the pipe P43. When the liquid surface in the tank 6 elevates and has reached a preliminarily set second position (for example, a position of 130 mm from the upper end of the tank 6), pressing down the open/close valve 44 by the valve shaft 43 is released and the open/close valve 44 is set in the "closed" state. This stops the supply of tap water to the inside of the tank 6.

Thus, the liquid surface of the tank 6 is controlled by the ball tap 4 to be positioned between the first position that is the lower limit position and the second position that is the upper limit position.

As illustrated in FIG. 5 and FIG. 7, between the partition plate 13 and the wall surface of the tank 6 at a side facing the partition plate 23 across the ball tap 4, a wash board 46 is disposed upright in a direction perpendicular to the support rod 42 of the ball tap 4 in plan view as illustrated in FIG. 5. When the water that flowed down on the support plate 12 from the circulation pipe P34 flows down to the liquid surface of the water accumulated in the tank 6 from the support plate 12 or when the tap water flowing in from the pipe P43 flows down to the liquid surface of the water accumulated in the tank 6, a wave occurs. The wash board 46 prevents this wave from reaching the floating ball 41 of the ball tap 4 and reducing detection accuracy of the liquid surface position detected by the floating ball 41. The wash board 46 includes one end (the upper end in FIG. 5) secured to the wall surface of the tank 6 by welding or similar method and the other end (the lower end in FIG. 5) secured to the partition plate 13 by welding or similar method.

—Structure and Operation of Executor 2—

Figure 8:
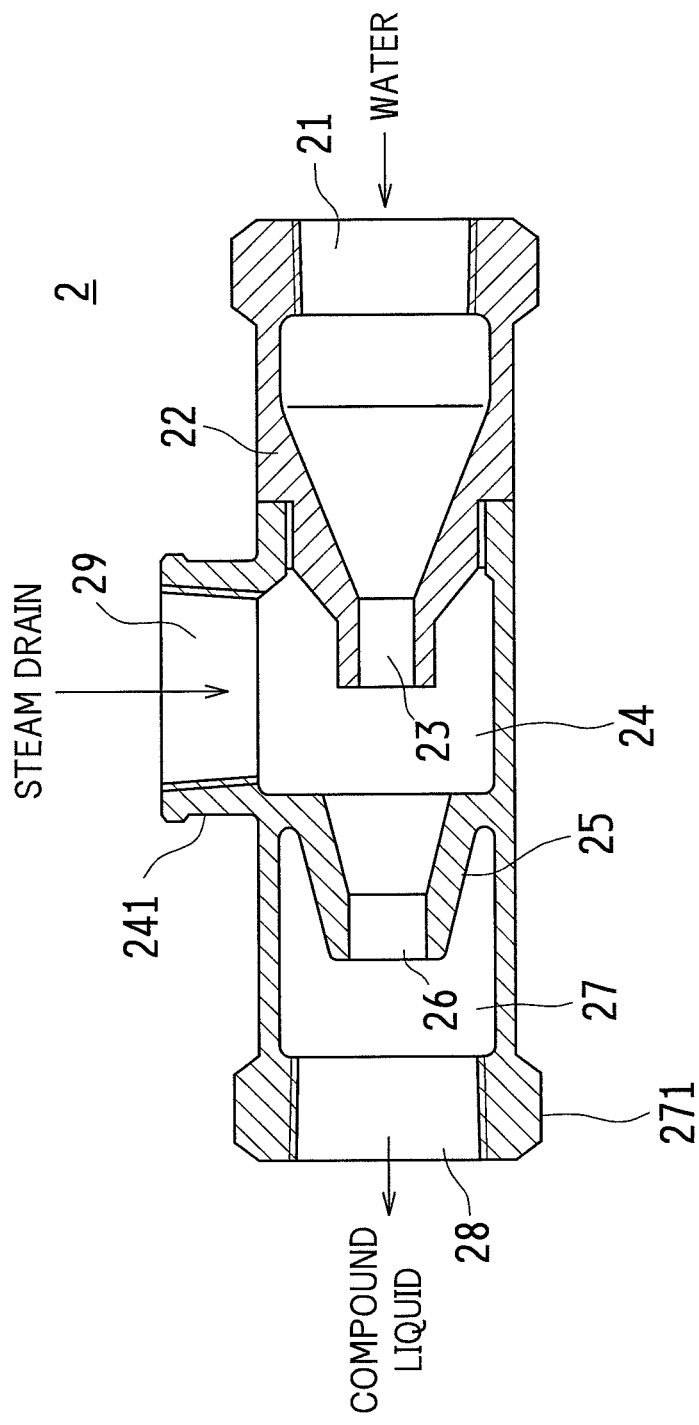
FIG. 8 is a cross-sectional view illustrating one example of ejector arranged in the heat recovery apparatus of FIG. 1.

Next, the structure of the ejector 2 will be described using FIG. 8. FIG. 8 is a cross-sectional view illustrating one example of the ejector 2 arranged in the heat recovery apparatus 100 of FIG. 1. The ejector 2 includes a water inlet 21, a first tapered portion 22, a first nozzle 23, a mixing chamber 24, a second tapered portion 25, a second nozzle 26, an accumulation chamber 27, a water outlet 28, and a drain suction port 29.

The water inlet 21 is an opening in which the water accumulated in the tank 6 flows sequentially through the circulation pipes P31, P32, and P33 after the water is pressure-fed by the pump 3. That is, the water inlet 21 is threadably mounted on (or fits) a one-side end portion (not illustrated) of the circulation pipe P33.

The first tapered portion 22 guides the water that has flowed in from the water inlet 21 to the first nozzle 23 along the taper in a tapered shape. The first nozzle 23 is formed at a distal end of the first tapered portion 22, and discharges the water that has flowed in from the water inlet 21 to the mixing chamber 24 at high speed. Discharging the water at high speed from the first nozzle 23 to the mixing chamber 24 generates a negative pressure in the mixing chamber 24 by what is called a "venturi effect". Subsequently, the negative pressure generated in the mixing chamber 24 allows suctioning steam drain supplied through the pipe P21 (see FIG. 3) from the drain suction port 29. Then the suctioned steam drain is mixed with the water discharged from the first nozzle 23 in the mixing chamber 24. The mixture of the steam drain and the water is referred to as a "compound liquid" for convenience in the following description.

The second tapered portion 25 guides the compound liquid in the mixing chamber 24 to the second nozzle 26 along a taper in a tapered shape. Here, the opening area of the second nozzle 26 is set larger than the opening area of the first nozzle 23. The second nozzle 26 is formed at a distal end of the second tapered portion 25, and discharges the compound liquid in the mixing chamber 24 to the accumulation chamber 27.

The accumulation chamber 27 temporarily accumulates the compound liquid discharged from the second nozzle 26. At the downstream side of the accumulation chamber 27, the water outlet 28 is formed. The water outlet 28 is an opening through which the compound liquid discharged from the second nozzle 26 flows into the tank 6 through the circulation pipe P34 (see FIG. 1).

The ejector 2 with the above-described configuration interposed between the circulation pipes P33 and P34 as illustrated in FIG. 1 allows efficiently recovering the steam drain supplied through the pipe P21 (see FIG. 3) from the drain suction port 29 and mixing the recovered steam drain with the circulating water, thus recovering the heat amount contained in the steam drain.

—Configuration and Operation of Heat Recovery System 300—

Figure 9:
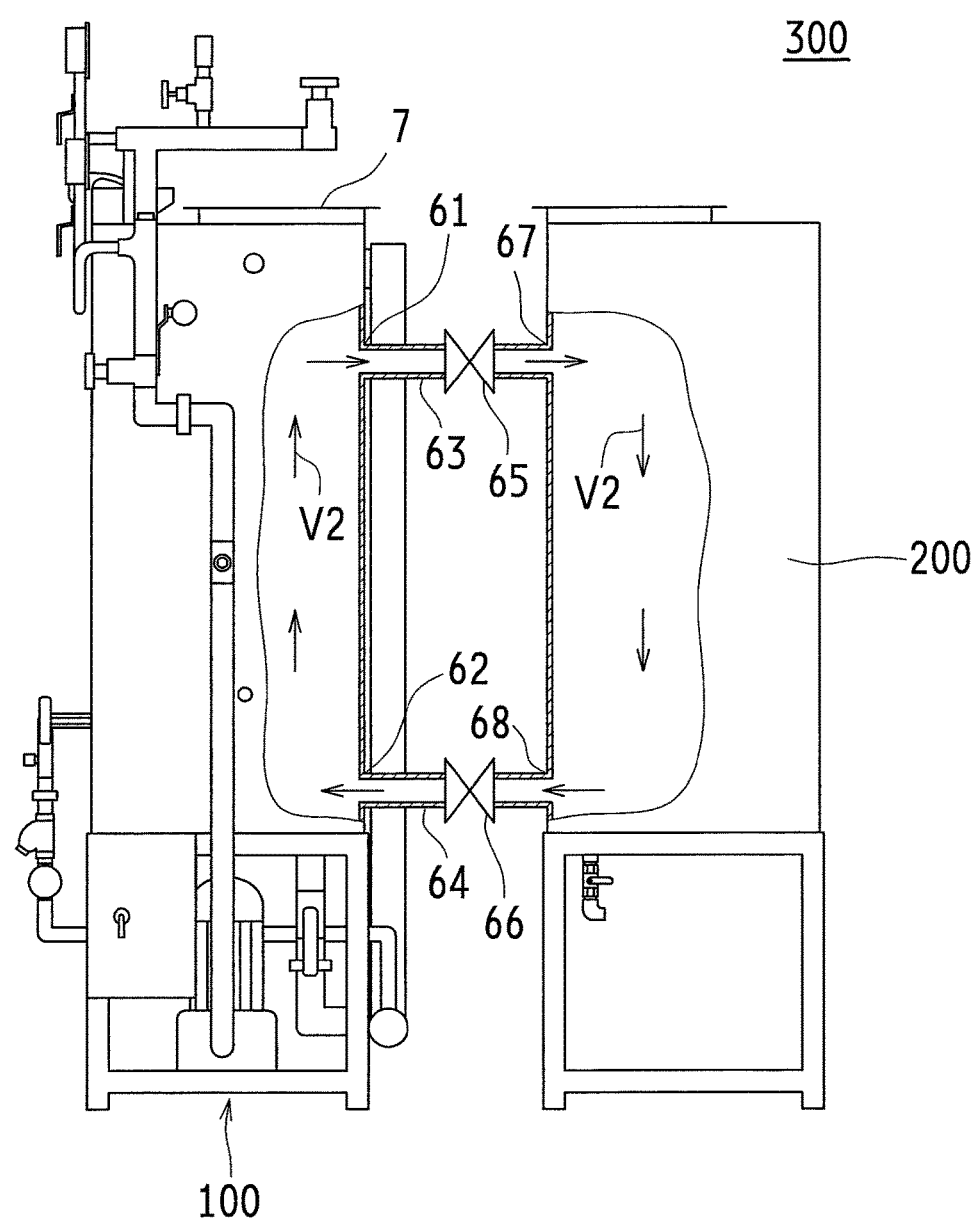
FIG. 9 is a view illustrating one example of a heat recovery system according to the present invention.

Next, a description will be given of a heat recovery system 300 that includes the heat recovery apparatus 100 and the reserve tank 200 by referring to FIG. 9. FIG. 9 is a view illustrating one example of the heat recovery system 300 according to the present invention. On the side surface of the tank 6 of the heat recovery apparatus 100, an outlet 61 and an inlet 62 are arranged. The water accumulated in the tank 6 flows out from the outlet 61. The inlet 62 is arranged at the lower side of the outlet 61. The water accumulated in the reserve tank 200 flows into the tank 6 through the inlet 62. The outlet 61 and the inlet 62 correspond to the "heat exchanging unit" described in the appended claims.

The reserve tank 200 is a quadrangular prism-shaped tank and accumulates the water quantity of about 250 liters, similarly to the tank 6 of the heat recovery apparatus 100. The reserve tank 200 includes an inlet 67 and an outlet 68. The outlet 68 is an opening formed on a side surface of the reserve tank 200 and through which the water accumulated in the reserve tank 200 flows out. The inlet 67 is an opening arranged at the upper side of the outlet 68 on the side surface of the reserve tank 200 and through which water accumulated in the tank 6 of the heat recovery apparatus 100 flows into the reserve tank 200.

The heat recovery system 300 includes a first pipe 63, a second pipe 64, a first valve 65, and a second valve 66. The first pipe 63 is a pipe that couples the outlet 61 of the heat recovery apparatus 100 and the inlet 67 of the reserve tank 200 together so as to allow the flow of the water. The second pipe 64 is a pipe that couples the outlet 68 of the reserve tank 200 and the inlet 62 of the heat recovery apparatus 100 together so as to allow the flow of the water.

The first valve 65 is a valve that is interposed in the first pipe 63 and switches flow and shutoff of water in the first pipe 63. The second valve 66 is a valve that is interposed in the second pipe 64 and switches flow and shutoff of water in the second pipe 64.

As described above, the water accumulated in the tank 6 of the heat recovery apparatus 100 is heated by the heat amount contained in the steam drain recovered by the ejector 2 so as to be controlled at a temperature in a range equal to or more than the third temperature T3 (for example, 70° C.) and equal to or less than the first temperature T1 for example, 80° C.). Here, as an initial state, a description will be given below of the case where the temperature of the water in the reserve tank 200 is an ordinary temperature (for example, 25° C.; and the first valve 65 and the second valve 66 are changed from the closed state to the open state.

The water accumulated in the reserve tank 200 is at an ordinary temperature (for example, 25° C.). The temperature of the water in the tank 6 of the heat recovery apparatus 100 is equal to or more than the third temperature T3 (for example, 70° C.) and equal to or less than the first temperature T1 (for example, 80° C.). Therefore, the density of the water accumulated in the reserve tank 200 is higher than the density of the water accumulated in the tank 6 of the heat recovery apparatus 100. Accordingly, when the second valve 66 changes from the closed state to the open state, the water accumulated in the reserve tank 200 flows into the tank 6 of the heat recovery apparatus 100 through the second pipe 64.

Subsequently, the water in the tank 6 of the heat recovery apparatus 100 is extruded and thus flows into the reserve tank 200 through the first pipe 63. Thus, as indicated by an arrow V2 in FIG. 9, an upward convective flow occurs in the tank 6 of the heat recovery apparatus 100 while a downward convective flow occurs in the reserve tank 200.

Thus, the water at high temperature flows into the reserve tank 200 while the water at low temperature is discharged from the reserve tank 200. This allows heat exchange using the convective flows, thus increasing the temperature of the water in the reserve tank 200.

Thus, the water heated inside of the tank 6 of the heat recovery apparatus 100 flows into the reserve tank 200 through the first pipe 63 that couples the outlet 61 of the heat recovery apparatus 100 and the inlet 67 of the reserve tank 200 together so as to allow the flow of the water. The water accumulated in the reserve tank 200 flows into the tank 6 of the heat recovery apparatus 100 through the second pipe 64 that couples the outlet 68 of the reserve tank 200 and the inlet 62 of the heat recovery apparatus 100 so as to allow the flow of the water. This allows efficiently heating the water accumulated in the reserve tank 200 by the heat exchange using the convective flows with the simple configuration.

While in this embodiment the case where the heat recovery apparatus 100 includes the outlet 61 and the inlet 62 on the side surface of the tank 6 has been described, an embodiment where the outlet 61 and the inlet 62 are substituted by a continuously formed opening is possible. That is, apparently, an embodiment where the outlet 61 and the inlet 62 are formed as one opening is possible. Similarly, an embodiment where the outlet 68 and the inlet 67 of the reserve tank 200 are apparently formed as one opening is possible. However, in this case, it is necessary to form a vertically long opening in order to efficiently perform heat exchange using the convective flows of the water accumulated in the tank 6 of the heat recovery apparatus 100 and the water accumulated in the reserve tank 200. Further, an embodiment where each two or more of the outlets 61 and the inlets 62 are formed on the side surface of the tank 6 in the heat recovery apparatus 100 is possible. Similarly, an embodiment where each two or more of the outlet 68 and the inlet 67 are formed on the side surface of the reserve tank 200 is possible.

In order to efficiently perform heat exchange using the convective flows, the first pipe 63 and the second pipe 64 are preferred to be arranged in vertically separated positions. This is because the larger the interval between the vertically separated positions of the first pipe 63 and the second pipe 64 is disposed, the more the flow rate of the convected water due to the difference in density of the water in the tank increases. Further, the first pipe 63 and the second pipe 64 are preferred to have a sufficiently large diameter (for example, a diameter of around 50 mm) so as not to hinder the flow of the convected water.

—Temperature Control of Water in Reserve Tank 200—

Further, the heat recovery system 300 includes a second temperature controller (not illustrated) that shuts off the first valve 65 and the second valve 66 in the case where the temperature of the water in the reserve tank 200 has reached a preliminarily set second temperature T2 (for example, 40° C.).

Specifically, for example, the first valve 65 and the second valve 66 are each constituted of an electrically-operated valve, and each include a sensor that detects the temperature of the water in the reserve tank 200. The above-described second temperature controller includes a central processing unit (CPU) and similar member. It is only necessary to output an instruction for setting the first valve 65 and the second valve 66 in the "closed" state when the temperature detected by the above-described sensor has reached the second temperature T2.

This shuts off the first valve 65, which is interposed in the first pipe 63 and switches flow and shutoff of the water in the first pipe 63, and the second valve 66, which is interposed in the second pipe 64 and switches flow and shutoff of the water in the second pipe 64, in the case where the temperature of the water in the reserve tank 200 has reached the preliminarily set second temperature T2 (for example, 40° C.). Thus, heating of the water accumulated in the reserve tank 200 is stopped. This allows controlling the temperature of the water in the reserve tank 200 at the second temperature T2 (for example, 40° C.).

In an industrial laundry, in the case where the water at 40° C. is generated in the reserve tank 200 as described above, this water can be supplied to, for example, a washing machine or similar machine.

While in this embodiment the case where the heat recovery system 300 includes one reserve tank 200 has been described, an embodiment where the heat recovery system 300 includes a plurality of the reserve tanks 200 is possible. In this case, the second temperature. T2 is preferred to be set for each reserve tank 200.

Specifically, for example, in the case where three reserve tanks 200 are coupled to one heat recovery apparatus 100, it is only necessary to set the second temperature T2 of a first reserve tank 200 to 60° C., set the second temperature T2 of a second reserve tank 200 to 50° C., and set the second temperature T2 of a third reserve tank 200 to 40° C. In this case, water controlled at 60° C., 50° C., and 40° C. can be generated.

Other Embodiments

While in this embodiment the case for recovering steam drain that includes at least one of steam used in a different device and drain where the steam used in the different device is condensed has been described, an embodiment that recovers another type of steam (for example, excess steam, leaked steam, and similar steam) or drain where the steam is condensed is possible.

—Separator 8—

While in this embodiment the steam drain, which includes the steam (used steam) used in the pants presser, the steam iron, or similar device and the drain where the steam is condensed, is supplied to the ejector 2 has been described, an embodiment where steam separated from the steam drain by a separator 8 is supplied to the ejector 2 is possible.

Figure 10:
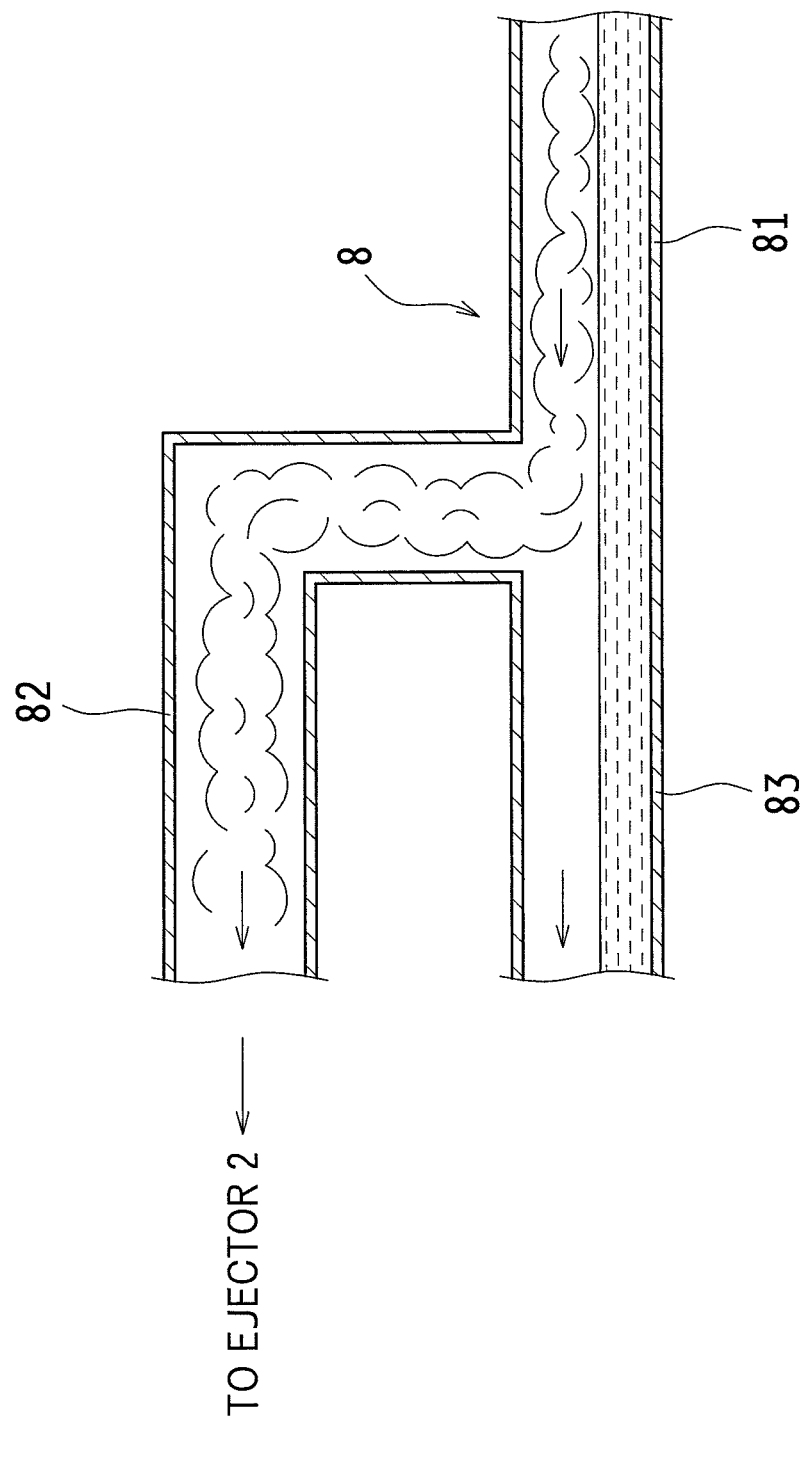
FIG. 10 is a view illustrating one example of a separator according the present invention.

Here, the separator 8 according to the present invention will be described by referring to FIG. 10. FIG. 10 is a view illustrating one example of the separator 8 according to the present invention. The separator 8 separates the steam drain into the steam and the drain, and includes a steam drain pipe 81, a steam pipe 82, and a drain pipe 83. The steam drain is inserted through the steam drain pipe 81. The steam is inserted through the steam pipe 82. The drain is inserted through the drain pipe 83. The steam drain pipe 81 branches into the steam pipe 82 and the drain pipe 83. The steam pipe 82 is coupled to the upper side of the steam drain pipe 81. The separator 8 corresponds to a "separating unit" described in the appended claims. The steam drain pipe 81, the steam pipe 82, and the drain pipe 83 respectively correspond to a "first pipe", a "second pipe", and a "third pipe" described in the appended claims.

The steam pipe 82 is coupled to the upper side of the steam drain pipe 81. Thus, only the steam in the steam drain inserted through the steam drain pipe 81 is suctioned by the ejector 2.

That is, the steam drain pipe 81, through which the steam drain is inserted, branches into the steam pipe 82, through which the steam is inserted, and the drain pipe 83, through which the drain is inserted. The steam pipe 82 is coupled to the upper side of the steam drain pipe 81. This allows separating the steam drain into the steam and the drain with the simple configuration.

The separator 8 separates the steam drain into the steam and drain. Therefore, the iron component in the steam drain remains in the drain as a residue, but the iron component is not contained in the steam. This steam without the iron component is suctioned by the ejector 2 so as to be mixed with the circulating water. Thus, the iron component contained in the steam drain is not mixed with water. Accordingly, it is not necessary to remove iron in the water within the tank 6 and the steam recovered by the ejector 2.

While in the above-described embodiment the case where the separator 8 includes the steam drain pipe 81, the steam pipe 82, and the drain pipe 83 has been described, the separator 8 may separate the steam drain into the steam and the drain using a method other than the above-described method. For example, an embodiment where the separator 8 includes the steam drain pipe 81 and a tank coupled to an end portion of the steam drain pipe 81 and steam without iron components are supplied to the ejector 2 through a steam pipe from a steam chest that is formed above the tank and houses the steam is possible.

The present invention can be employed in a heat recovery apparatus and a heat recovery system that recover steam drain that includes at least one of steam used in a different device and drain where the steam used in the different device is condensed, so as to recover heat contained in the steam drain.

The invention claimed is:

1. A heat recovery apparatus for recovering steam drain that includes at least one of steam used in a different device and drain where the steam used in the different device is condensed so as to recover heat contained in the steam drain, the heat recovery apparatus comprising:
   a pump configured to circulate water accumulated in a tank through a circulation pipe;
   an ejector interposed in the circulation pipe, the ejector being configured to suction the steam drain and mix the steam drain with the circulating water so as to recover the steam drain; and
   a first temperature control unit configured to perform a temperature control of the water in the tank by replenishing the tank with water from outside after a part of the water in the tank is discharged in a case where the water in the tank has reached a preliminarily set first temperature,
   wherein the circulation pipe is coupled to a discharge side of the ejector so that the water discharged from the ejector flows out from an upper side of the tank into the tank,
   wherein, in the tank, a water flow passage for the water flowing out from the circulation pipe coupled to the discharge side of the ejector is formed, above a surface of the water accumulated in the tank, by a substantially horizontal support plate, a part of an inner wall of the tank and a partition plate, and
   wherein a rod-like permanent magnet configured to remove irons in water is detachably secured to a top surface of the support plate in a manner intersecting with the water flow passage.

2. The heat recovery apparatus according to claim 1, further comprising
   a heat exchanging unit arranged at a side surface of the tank, the heat exchanging unit being configured to perform heat exchange using a convective flow due to a temperature difference with respect to water accumulated in a different tank,
   wherein the heat exchanging unit includes:
   at least one outlet through which the water accumulated in the tank flows out; and
   at least one inlet arranged at a lower side of the outlet, the water accumulated in the different tank flowing into the tank through the inlet.

3. The heat recovery apparatus according to claim 1, further comprising
   a separating unit configured to separate the steam drain into steam and drain, wherein
   the ejector is configured to suction the steam separated from the steam drain by the separating unit and mix the steam with the circulating water so as to recover the steam.

4. The heat recovery apparatus according to claim 3, wherein
   the separating unit includes:
   a first pipe through which the steam drain is inserted;
   a second pipe through which the steam is inserted; and
   a third pipe through which the drain is inserted, wherein
   the first pipe branches into the second pipe and the third pipe, and
   the second pipe is coupled to an upper side of the first pipe.

5. A heat recovery system, comprising:
the heat recovery apparatus according to claim 2; and
a reserve tank in which water is accumulated, wherein the reserve tank includes:
at least one outlet through which the water accumulated in the reserve tank flows out, the at least one outlet being disposed in a lower portion of the reserve tank;
at least one inlet arranged at an upper side of the outlet, the water accumulated in the tank of the heat recovery apparatus flowing into the reserve tank through the inlet;
a first pipe that couples the outlet of the heat recovery apparatus and the inlet of the reserve tank together so as to allow flow of water; and
a second pipe that couples the outlet of the reserve tank and the inlet of the heat recovery apparatus together so as to allow flow of water.

6. The heat recovery system according to claim 5, further comprising:
a first valve interposed in the first pipe to switch flow and shutoff of water in the first pipe;
a second valve interposed in the second pipe to switch flow and shutoff of water in the second pipe; and
a second temperature control unit configured to shut off the first valve and the second valve in a case where a temperature of the water in the reserve tank has reached a preliminarily set second temperature.

7. The heat recovery apparatus according to claim 1,
wherein the first temperature control unit includes a ball tap having a floating hall configured to detect moving up and down of a water level in the tank, and
wherein a wash hoard is provided in the tank so as to prevent a wave from reaching the floating ball, the wave that occurs when the water flows down from the support plate to the water surface in the tank via the water flow passage.

8. The heat recovery apparatus according to claim 2,
wherein the first temperature control unit includes a ball tap having a floating ball configured to detect moving up and down of a water level in the tank, and
wherein a wash board is provided in the tank so as to prevent a wave from reaching the floating hall, the wave that occurs when the water flows down from the support plate to the water surface in the tank via the water flow passage.

9. The heat recovery apparatus according to claim 3,
wherein the first temperature control unit includes a hall tap having a floating ball configured to detect moving up and down of a water level in the tank, and
wherein a wash hoard is provided in the tank so as to prevent a wave from reaching the floating ball, the wave that occurs when the water flows down from the support plate to the water surface in the tank via the water flow passage.

10. The heat recovery apparatus according to claim 4,
wherein the first temperature control unit includes a ball tap having a floating ball configured to detect moving up and down of a water level in the tank, and
wherein a wash board is provided in the tank so as to prevent a wave from reaching the floating ball, the wave that occurs when the water flows down from the support plate to the water surface in the tank via the water flow passage.

11. The heat recovery apparatus according to claim 5,
wherein the first temperature control unit includes a ball tap having a floating ball configured to detect moving up and down of a water level in the tank, and
wherein a wash board is provided in the tank so as to prevent a wave from reaching the floating ball, the wave that occurs when the water flows down from the support plate to the water surface in the tank via the water flow passage.

12. The heat recovery apparatus according to claim 6,
wherein the first temperature control unit includes a ball tap having a floating ball configured to detect moving up and down of a water level in the tank, and
wherein a wash board is provided in the tank so as to prevent a wave from reaching the floating ball, the wave that occurs when the water flows down from the support plate to the water surface in the tank via the water flow passage.

13. The heat recovery apparatus according to claim 1,
wherein an inspection lid is reclosably disposed on a top surface of the tank so that the permanent magnet is checked, and detached from/attached to the support plate.

14. The heat recovery apparatus according to claim 2,
wherein an inspection lid is reclosably disposed on a top surface of the tank so that the permanent magnet is checked, and detached from/attached to the support plate.

15. The heat recovery apparatus according to claim 3,
wherein an inspection lid is reclosably disposed on a top surface of the tank so that the permanent magnet is checked, and detached from/attached to the support plate.

16. The heat recovery apparatus according to claim 4,
wherein an inspection lid is reclosably disposed on a top surface of the tank so that the permanent magnet is checked, and detached from/attached to the support plate.

17. The heat recovery apparatus according to claim 5,
wherein an inspection lid is reclosably disposed on a top surface of the tank so that the permanent magnet is checked, and detached from/attached to the support plate.

18. The heat recovery apparatus according to claim 6,
wherein an inspection lid is reclosably disposed on a top surface of the tank so that the permanent magnet is checked, and detached from/attached to the support plate.

19. The heat recovery apparatus according to claim 7,
wherein an inspection lid is reclosably disposed on a top surface of the tank so that the permanent magnet is checked, and detached from/attached to the support plate.

* * * * *